(12) United States Patent
Krasel et al.

(10) Patent No.: US 11,713,011 B2
(45) Date of Patent: Aug. 1, 2023

(54) BUMPER ASSEMBLY WITH REINFORCED IMPACT DISPERSION PLATES

(71) Applicant: Shape Corp., Grand Haven, MI (US)

(72) Inventors: Andreas Krasel, Munich (DE); Stephane Anquetil, Le Chesnay (FR); Jan Špergl, Starý Plzenec (CZ); Pritish Avachat, Pune (IN)

(73) Assignee: Shape Corp., Grand Haven, MI (US)

( * ) Notice: Subject to any disclaimer, the term of this patent is extended or adjusted under 35 U.S.C. 154(b) by 66 days.

(21) Appl. No.: 17/533,930

(22) Filed: Nov. 23, 2021

(65) Prior Publication Data

US 2022/0161745 A1 May 26, 2022

Related U.S. Application Data

(60) Provisional application No. 63/117,091, filed on Nov. 23, 2020.

(51) Int. Cl.
*B60R 19/18* (2006.01)

(52) U.S. Cl.
CPC ...... *B60R 19/18* (2013.01); *B60R 2019/1806* (2013.01); *B60R 2019/186* (2013.01)

(58) Field of Classification Search
CPC .............. B60R 19/18; B60R 2019/186; B60R 2019/1806
See application file for complete search history.

(56) References Cited

U.S. PATENT DOCUMENTS

| 2019/0248313 A1 | 8/2019 | Garbutt et al. |
| 2022/0242347 A1* | 8/2022 | Berger .................... B60R 19/03 |

FOREIGN PATENT DOCUMENTS

| CN | 113276792 A | * | 8/2021 | ............. B60R 19/04 |
| DE | 102020130039 B3 | * | 2/2022 | ............. B60R 19/18 |
| JP | 2019051833 A | | 4/2019 | |
| KR | 20150104902 A | | 9/2015 | |
| WO | WO-2022175143 A1 | * | 8/2022 | |

OTHER PUBLICATIONS

International Search Report and Written Opinion for PCT/US2021/060579, dated Mar. 10, 2022, 7 pages.

* cited by examiner

*Primary Examiner* — Dennis H Pedder
*Assistant Examiner* — Melissa Ann Bonifazi
(74) *Attorney, Agent, or Firm* — Bodman PLC

(57) ABSTRACT

A vehicle bumper assembly includes a bumper beam and a crush can attached to an end portion of the bumper beam. An impact dispersion plate is attached to a front face of the bumper beam at the end portion of the bumper beam. A front surface of the impact dispersion plate extends downward from the front face of the bumper beam. A lower reinforcement member attached to a rear surface of the impact dispersion plate and extends along a lower section of the impact dispersion plate. An upright reinforcement member has an upper portion attached to the bumper beam and a lower portion attached to the lower reinforcement member. The upright and lower reinforcement members are configured, upon impact with a barrier, to disperse deformation of the barrier over the impact dispersion plate below the bumper beam.

20 Claims, 11 Drawing Sheets

BUMPER ASSEMBLY WITH REINFORCED IMPACT DISPERSION PLATES

CROSS-REFERENCE TO RELATED APPLICATION

This application claims priority under 35 U.S.C. § 119(e) to U.S. Provisional Patent Application No. 63/117,091, filed Nov. 23, 2020, the disclosure of this prior application is considered part of this application and is hereby incorporated by reference in its entirety.

TECHNICAL FIELD

The present disclosure relates to impact energy absorbing support structures for vehicles, and more particularly to a bumper assemblies and associated components.

BACKGROUND

Vehicles are subjected to various crash tests that are mandated by government regulations and insurance certifications, such as the Insurance Institute for Highway Safety (IIHS), the National Highway Traffic Safety Administration (NHTSA), and the Research Counsel for Vehicle Repairs. These crash tests are provided for impact energy management and absorption from high speed and low speed crash impacts at various locations on the vehicle. For example, the IIHS administers a Small Overlap Rigid Barrier (SORB) test that provides an impact that covers about 25% of the vehicle front end at a distance about 25% from the longitudinal centerline of the vehicle. As another example, a movable progressive deformable barrier (MPDB) test also provides an impact at a barrier that covers less than half of the vehicle's front bumper. The results of these tests may be dependent on various vehicle components and designs, including the ability of the vehicle bumper to disperse impact deformation over specified sections of the barrier.

SUMMARY

The present disclosure provides reinforced impact dispersion plates for vehicle bumper assemblies. The vehicle bumper assembly includes a bumper beam and crush cans that support end portions of the bumper beam. The impact dispersion plates are attached to the front impact face of the bumper beam at the end portions of the bumper beam. The impact dispersion plates extend downward below the front face of the bumper beam to expand the effective impact surface of the bumper assembly. To support and reinforce the additional impact surface provided by each impact dispersion plate, a lower reinforcement member may be attached along a lower section of the impact dispersion plate and an upright reinforcement member may be attached between the bumper beam and the lower reinforcement member. The upright and lower reinforcement members are configured, upon impact with a barrier, such as a movable progressive deformable barrier, to disperse deformation of the barrier over the impact dispersion plate below the bumper beam. In addition to increasing the effectiveness of the impact dispersion plate, the reinforcement members also provide significantly less mass and more packaging space flexibility than lower cross members and secondary crush can arrangements.

According to one aspect of the present disclosure, a vehicle bumper assembly includes a bumper beam and a crush can attached to an end portion of the bumper beam. An impact dispersion plate is attached to a front face of the bumper beam at the end portion of the bumper beam. A front surface of the impact dispersion plate extends downward from the front face of the bumper beam. A lower reinforcement member attached to a rear surface of the impact dispersion plate and extends along a lower section of the impact dispersion plate. An upright reinforcement member has an upper portion attached to the bumper beam and a lower portion attached to the lower reinforcement member. The upright and lower reinforcement members are configured, upon impact with a barrier, to disperse deformation of the barrier over the impact dispersion plate below the bumper beam.

Implementations of the disclosure may include one or more of the following optional features. In some implementations, the upright reinforcement member includes a U-shaped cross section between the upper and lower portions that is attached to the rear surface of the impact dispersion plate to define a hollow beam structure. Also, in some implementations, the lower reinforcement member includes a U-shaped cross section extending at least partially along a length of the lower reinforcement member, where the U-shaped cross section has legs that are attached to the rear surface of the impact dispersion plate to define a secondary hollow beam structure. In additional examples, the upper and/or lower reinforcement members include tubular members with hollow cross sections. With respect to relative positioning, in some examples, at least a section the lower reinforcement member is disposed in substantially parallel alignment with the end portion of the bumper beam, such as to form a partial lower cross member.

In some implementations, a distal end of the bumper beam extends outboard from the crush can, such that the distal end of the bumper beam may extend outboard from the attachment of the impact dispersion plate and the upright reinforcement member. In some examples, the lower section of the impact dispersion plate extends outboard from the distal end of the bumper beam, such that the lower reinforcement member may extends from inboard of the crush can to outboard of the distal end of the bumper beam.

In further implementations, the bumper assembly includes an upper dispersion plate that is attached to a front face of the bumper beam at the end portion of the bumper beam and extends upward from the front face of the bumper beam. In some examples, the upper portion of the upright reinforcement member extends above the bumper beam and attaches at a rear surface of the upper dispersion plate.

According to another aspect of the present disclosure, a vehicle bumper assembly includes a bumper beam that has a front face configured to be deposed behind a front fascia. A crush can has a front end attached at an end portion of the bumper beam and a rear end configured to attach to a frame member. An impact dispersion plate is coupled with the front face at the end portion of the bumper beam. The impact dispersion plate extends downward from the front face of the bumper beam. A horizontal reinforcement member is attached at a rear surface of the impact dispersion plate and extends along a lower section of the impact dispersion plate. A vertical reinforcement member has an upper portion attached at a rear face of the bumper beam and a lower portion attached to the horizontal reinforcement member. The horizontal and vertical reinforcement members are configured upon impact with a barrier to disperse deformation of the barrier over the impact dispersion plate below the bumper beam.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference numerals indicate like parts throughout the drawings.

DETAILED DESCRIPTION

Figure 1:
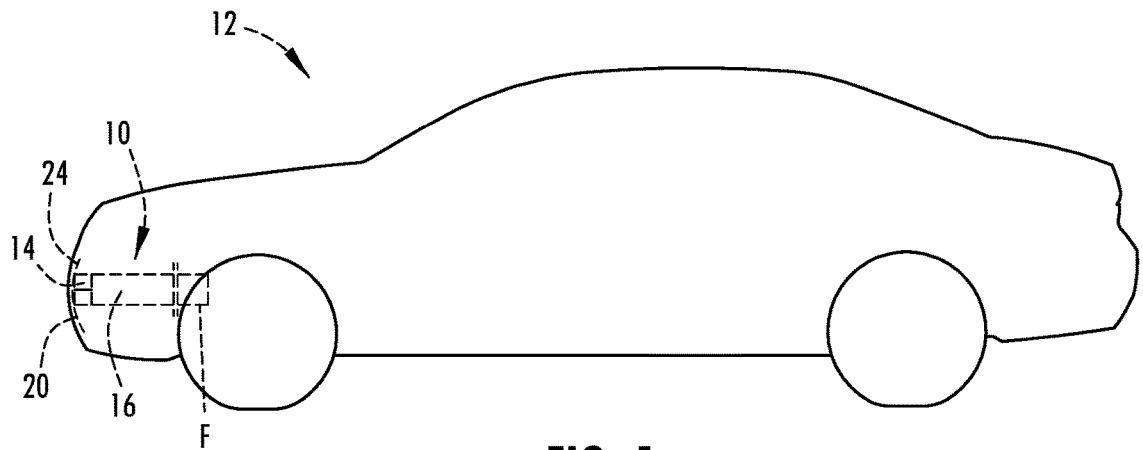
FIG. 1 is a schematic side elevation view of a vehicle having a bumper assembly.
Figure 2:
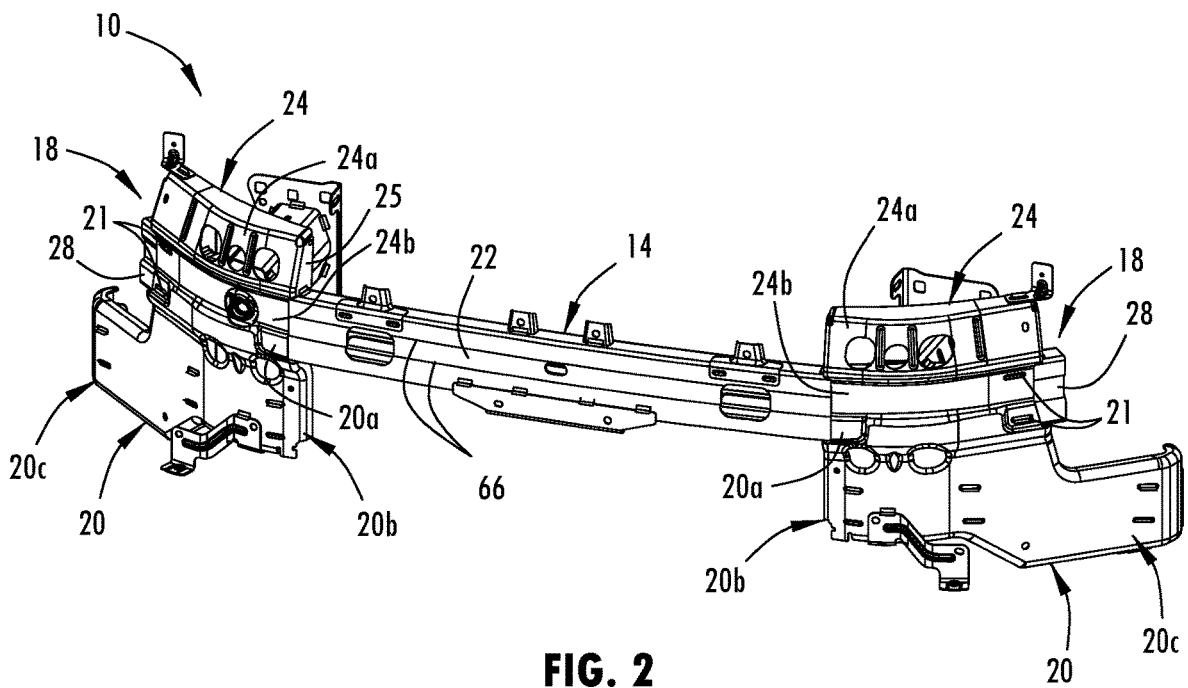
FIG. 2 is a front perspective view of a bumper assembly.
Figure 4:
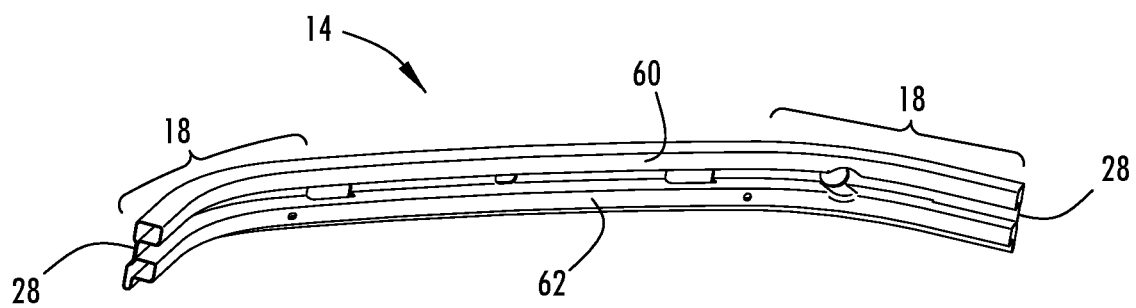
FIG. 4 is a rear perspective view of the bumper beam shown in FIG. 2.

Referring now to the drawings and the illustrative examples depicted therein, a bumper assembly 10 for a vehicle 12, such as shown in FIG. 1, has a bumper beam 14 that is supported by crush cans 16 that are attached to end portions 18 of the bumper beam 14 at generally equal spacing from a center of the bumper beam 14. The crush cans 16 of the bumper assembly 10 each mount to a frame member F, such as a frame rail or other portion of a conventional vehicle frame or frame-like structure. The crush cans 16 support and position the bumper beam 14 to span laterally across a front end of the vehicle 12, such as illustrated in FIG. 1. The front face of the bumper beam 14 is disposed behind a front fascia of the vehicle 12. As shown in FIGS. 2 and 4, the bumper beam 14 curves rearward at the end portions 18 of the bumper beam 14 relative to the central section that protrudes forward, such as to have a shape that corresponds with a front end design of a vehicle as it spans laterally across the vehicle. The radius of curvature at the end portions in additional examples may vary from the example shown in FIG. 2, and in some examples the beam may have a consistent curvature along the its length. The bumper assembly 10 shown in FIG. 1 is mounted at the front end of the vehicle 12, which may be a passenger vehicle or other type of motor vehicle, such as a truck, bus, van, or sport utility vehicle or the like, and it is contemplated that the bumper assembly and other examples thereof may be used or otherwise incorporated into a rear end of a vehicle.

The bumper assembly 10 is provided with impact dispersion plates 20 that are disposed at the end portions 18 of the bumper beam 14. As shown for example in FIG. 2, the impact dispersion plates 20 are attached to the front face 22 of the bumper beam 14 and extend downward below the front face 22 of the bumper beam 14 to expand an effective impact surface of the bumper assembly 10. In addition, the example shown in FIG. 2 has upper dispersion plates 24 attached to the front face 22 of the bumper beam 14 and extend upward above the front face 22 to also expand the effective impact surface of the bumper assembly. As shown in FIG. 2, the upper dispersion plates 24 are integral with the impact dispersion plates 20, such that together an upper dispersion plate and an impact dispersion plate are a single integral piece. Accordingly, the upper dispersion plate may also be referred to as an upper plate section of the impact dispersion plate. However, in some examples, the upper dispersion plates may be separate pieces from the impact dispersion plates, such as to reduce the mass and material of plates that overlap the front face of the bumper beam. In such examples, the upper and impact dispersion plates may be separately attached to the bumper beam and extends both above and below the bumper beam.

The impact dispersion plates 20 and upper dispersion plates 24 may have various shapes to expand the effective impact surface within the packaging constraints and impact performance of a vehicle front end design. As shown in FIG. 2, the impact dispersion plates 20 each include an upper section 20a with generally planar areas that overlap and attached at the lower area of the front face 22 of the bumper beam 14. The upper section 20a may conform at least partially to the shape of the front face 22, such as shown in FIG. 2 with the upper section 20a having the planar areas mated against the front face 22 and a horizontal groove that is inserted at least partially into a stiffening channel 66 that extends along the front face 22 of the bumper beam 14. The upper section 20a of the impact dispersion plates 20 is attached to the bumper beam 14 in a fixed manner, such as with welding at a weld cutout 21, to secure the upper section 20a to the front face 22. The upper section in other examples may be attached to the bumper beam with additional or alternative attachment features, such as fasteners, adhesives, or the like.

Figure 3:
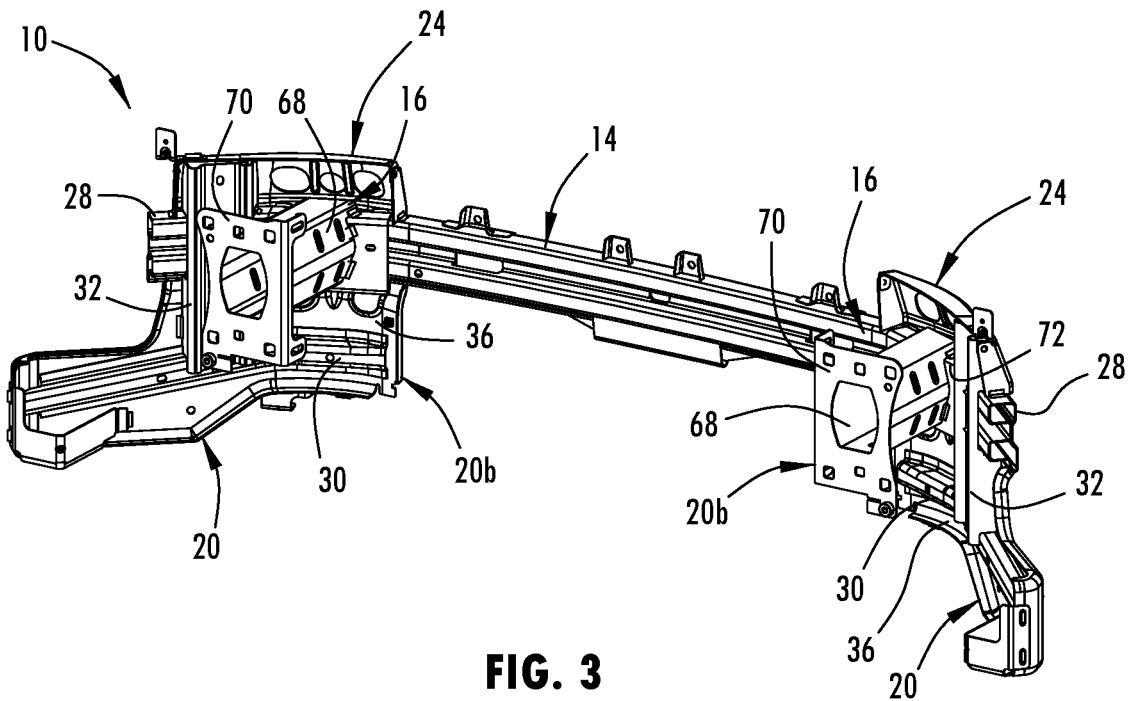
FIG. 3 is a rear perspective view of the bumper assembly shown in FIG. 2.

As further provided in the example illustrated in FIG. 2, the shape of the impact dispersion plates 20 extends rearward and downward from the upper sections 20a to substantially align the planar extent of the front surface 26 of the lower sections 20b with the front face 22 of the bumper beam 14. The lower sections 20b of the impact dispersion plates 20 may also include a curvature that generally corresponds with the curvature of the end portions 18 of the bumper beam 14. The lower sections 20b may also extend laterally outboard from the distal ends 28 of the bumper beam 14. As shown in FIGS. 2 and 3, the lower sections 20b of the impact dispersion plates 20 each span from an inboard edge that is located inboard of the attachment of the crush can 16 to an outboard edge that is located outboard of the distal end 28 of the bumper beam 14. As the lower section 20b extends laterally outboard, the lower section 20b also extends downward to form a gap between an outboard portion 20c of the lower section 20b and the end portion 18 of the bumper beam 14. Thus, as shown in FIG. 2, an upper edge of the outboard portion 20c is spaced from the end portion 18 of the bumper beam 14. The bottom edge of the lower section 20b of the impact dispersion plates 20 is shown in FIG. 2 having an inboard segment of the bottom edge that is substantially horizontal and an outboard segment of the bottom edge that is lower than the inboard segment and is also substantially horizontal, such that an intermediate segment of the bottom edge angles downward as it connects from the inboard segment to the outboard segment. To assist with maintaining the shape of the impact dispersion plates 20, the edges extending around the lower section 20b are formed, such as via a stamping, to have a rearward curved flange. The rearward curved flange provides a rounded corner at the edges of the impact dispersion plates 20, which also assist in preventing tearing of a soft impact barrier or the like. In additional examples, the edges of the impact dispersion plates may be located at different positions relative to the bumper beam and may have various alternative shapes, such as to locate and size the dispersion plates within the package space provided by the front end design of the respective vehicle.

As also shown in FIG. 2, the upper dispersion plates 24 each have a lower section 24b that overlaps and is attached at the upper area of the front face 22 of the bumper beam 14. The lower section 24b may conform at least partially to the shape of the front face 22. The lower section 24b shown in FIG. 2 is attached to the bumper beam 14 with welding at the weld cutout 21 of the lower section 24b. The upper dispersion plates 24 are also attached to the upper wall of the bumper beam 14 with a weld at lower edges of walls 25 of the upper dispersion plates 24 that extend rearward from the front face. Similar to the attachment of the impact dispersion plate, the lower section in other examples may be attached to the bumper beam with additional or alternative features, such as fasteners, adhesives, or the like.

In the example shown in FIG. 2, the shape of the upper dispersion plates 24 also angle slightly rearward as they extend upward from the lower section 24b that is generally aligned and interconnected with the front face 22 of the bumper beam 14. The upper sections 24a of the upper dispersion plates 24 may also include a curvature along the length of the bumper beam that generally corresponds with the curvature of the end portions 18 of the bumper beam 14. As shown in FIG. 2, the upper sections 24a of the upper dispersion plates 24 each span from an inboard edge that is located inboard of the attachment of the crush can 16 (e.g., generally aligned with inboard of the impact dispersion plate) to an outboard edge that is located inboard of the distal end 28 of the bumper beam 14. To assist with maintaining the shape of the upper dispersion plates 24, the edges extending around the upper section 24a are formed, such as by stamping, to have a rearward curved flange that transitions to the rearward extending walls 25. Again, in additional examples, the edges of the upper dispersion plates may be located at different positions relative to the bumper beam and may have various alternative shapes, such as to position and size the dispersion plates within the package space provided by the front end design of the respective vehicle.

The impact and upper dispersion plates 20, 24 may be formed with various materials and combinations of materials, such metal sheets, polymers, composites, and the like. The examples of the impact dispersion plates 20 and the upper dispersion plates 24 shown in FIGS. 2 and 3 are formed together from a single metal sheet that is stamped to provide the desired shape. The metal sheet may be a steel alloy, such as a high-strength steel (e.g., a dual-phase steel). In other examples the metal sheet used to form the impact dispersion plates and/or the upper dispersion plates may include different alloys, such as aluminum or ultra-high strength steel.

To support and reinforce the additional impact surface provided by the impact dispersion plate 20 and the upper dispersion plate 24, reinforcement members may be provided at various sections thereof, such as at the rear surface. As shown in the example in FIG. 3, a lower reinforcement member 30 is attached along the lower section 20b of the impact dispersion plate and an upright reinforcement member 32 is attached between the bumper beam 14 and the lower reinforcement member 30. The lower and upright reinforcement members 30, 32 are configured, upon impact with a barrier, such as a movable progressive deformable barrier 34 as shown for example in FIG. 5, to disperse deformation of the barrier over the impact dispersion plate 20 below the bumper beam 14. In addition to increasing the effectiveness of the impact dispersion plate, the reinforcement members also provide significantly less mass and more packaging space flexibility than lower cross members and secondary crush can arrangements.

Figure 3A:
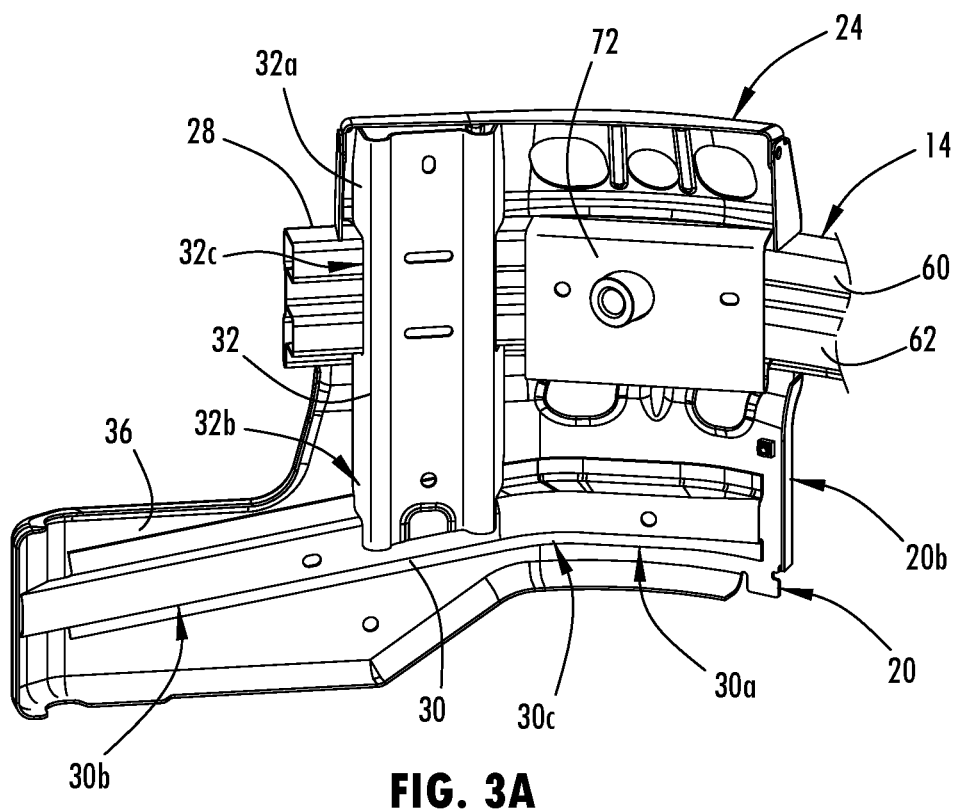
FIG. 3A is an enlarged rear perspective view of an impact dispersion plate of a bumper assembly.

As shown in FIG. 3A, the lower reinforcement member 30 is attached to a rear surface 36 of the impact dispersion plate 20 and extends along a lower section 20b of the impact dispersion plate 20. The lower reinforcement member 30 may be a beam-shaped reinforcement, such as a beam structure with a consistent cross-sectional shape along its length, such as a closed tubular cross section (e.g., a single or multi-hollow tubular shape with circular or non-circular shaped cross sectional hollow openings) or an open cross section (e.g., a C-shape or U-shape). As shown in the example in FIGS. 3 and 3A, the lower reinforcement member 30 includes a U-shaped cross section that extends at least partially along a length of the lower reinforcement member 30. The U-shaped cross section has legs that extend from a central portion, such as to form a hat shaped cross-sectional shape as shown in FIG. 3A. As further shown in FIG. 3A, the lower reinforcement member 30 has a substantially consistent U-shape cross section along its length. The legs of the U-shaped cross section attach to the rear surface 36 of the impact dispersion plate 20 to define a hollow beam structure that has an enclosed hollow area surrounded by the combined U-shaped cross section of the lower reinforcement member 30 and the rear surface 36 of the impact dispersion plate 20.

In some examples, at least a section the length of the lower reinforcement member 30 is disposed in parallel or substantially parallel alignment with the end portion 18 of the bumper beam 14, such as to form a partial lower cross member. Accordingly, in some examples, the lower reinforcement member may also be referred to as a horizontal reinforcement member. As shown in FIG. 3A, the lower reinforcement member 30 angles downward as it extends outboard to generally follow the contour of the bottom edge of the lower section 20b of the impact dispersion plate 20. As such, the lower reinforcement member 30 has an inboard section 30a that is substantially horizontal and an outboard section 30b that is lower than the inboard section 30a and angled downward, where an intermediate section 30c of the lower reinforcement member 30 includes a curvature that transitions from the inboard section 30a to the downward extending angle of the outboard section 30b. Thus, the length of the lower reinforcement member 30 may span laterally from a location inboard of the crush can (i.e., at the inboard section 30a) to outboard of the distal end 28 of the bumper beam 14 (i.e., at the outboard section 30b). In the example shown in FIG. 3A, at least a portion of the inboard section 30a is located inboard on the vehicle relative to the crush can and at least a portion of the outboard section 30b is located outboard on the vehicle relative to the distal end 28 of the bumper beam 14.

As further shown in FIG. 3A, the upright reinforcement member 32 has an upper portion 32a attached to the bumper beam 14 and a lower portion 32b attached to the lower reinforcement member 30. The upright reinforcement member 32 may be a beam-shaped reinforcement, such as a beam structure with a consistent cross-sectional shape along its length, such as a closed tubular cross section (e.g., a single or multi-hollow tubular shape with circular or non-circular shaped cross sectional hollow openings) or an open cross section (e.g., a C-shape or U-shape). As shown in the example in FIGS. 3 and 3A, the upright reinforcement member 32 includes a U-shaped cross section that extends along the substantial entire length of the upright reinforcement member 32, such as between the upper and lower portions 32a, 32b. The lower portion 32b of the upright reinforcement member 32 is attached to the rear surface of the impact dispersion plate to define a hollow beam structure therebetween. Similarly, the upper portion 32b of the upright reinforcement member 32 is attached to the rear surface of the upper dispersion plate 24 to define a hollow beam structure therebetween. The U-shaped cross section has legs that extend from a central portion and attach to the rear surface 36 of the impact dispersion plate 20 to define such a hollow beam structure. In some examples, at least a section the lower reinforcement member 30 is disposed in a vertical or a substantially vertical orientation, such as to be generally perpendicular or substantially perpendicular to the end portion 18 of the bumper beam 14. Accordingly, in some examples, the upright reinforcement member may also be referred to as a vertical reinforcement member.

In some examples, such as shown in FIG. 3A, an intermediate portion 32c of the upright reinforcement member 32, between the upper and lower portions 32a, 32b, attaches to the rear portion or surface of the bumper beam 14. As shown in FIG. 3A, the U-shaped cross section of the intermediate portion 32c of the upright reinforcement member 32 includes cutout notches at the legs that engage around the tubular sections 60, 62 of the bumper beam 14. The central portion of the upright reinforcement member 32 is shown in FIG. 3A welded to the tubular sections 60, 62 of the bumper beam 14. In some examples the reinforcement members may be attached to the dispersion plates and the bumper beam with additional or alternative attachment features from welding, such as fasteners, adhesives, tape, or the like, such as in instances of different materials that are not suited for welding together.

The reinforcement members may also include stiffening features, such as to increase the stiffness of the reinforcement member along its length. As shown for example in FIG. 3A, the upright reinforcement member 32 includes a stiffening channel that extends along the length at a centrally location on the central portion of the cross-sectional shape. Additional or alternative stiffening features may be incorporated in other examples of reinforcement members.

In additional examples, more or fewer reinforcement members may be attached to or integrated with the dispersion plates. The reinforcement members may be embodied in various configurations and materials, such as steel, aluminum, and fiber-reinforced composites, among other materials or combinations thereof. As shown for example in FIGS. 3 and 3A, the lower and upright reinforcement members 30, 32 are manufactured by stamping a steel sheet. It is also contemplated that the lower reinforcement member and/or lower reinforcement member may be manufactured by roll forming a metal sheet, such as an aluminum sheet or a steel sheet, such as AHSS (Advanced High Strength Steel) that has a tensile strength of about 800 to 2000 MPa (i.e. about 120 to 290 ksi), to provide a continuous beam that is cut to length to define the ends of each reinforcement member.

In some implementations, such as shown in FIGS. 2 and 3, the distal end 28 of the bumper beam 14 extends outboard from the crush can 16, such that the distal end 28 of the bumper beam 14 may extend outboard from the attachment of the impact dispersion plate 20 and the upper dispersion plate 24, such as to provide a further supported impact surface area outboard the crush can. In other examples, such as shown in FIG. 3A, the distal end 28 of the bumper beam 14 may be disposed at or near the outboard edges of the impact dispersion plate 20 and the upper dispersion plate 24 at the attachment with the bumper beam 14.

The bumper beam 14 of the bumper assembly 10 may be embodied in various configurations and materials, such as steel, aluminum, and fiber-reinforced composites, among other materials or combinations thereof. As shown for example in FIGS. 4 and 4A, the bumper beam 14 has a multi-tubular shape that is manufactured by continuously roll forming a high-strength steel sheet, namely AHSS (Advanced High Strength Steel) that has a tensile strength of about 800 to 2000 MPa (i.e. about 120 to 290 ksi), to provide a continuous beam that is cut to length to define the ends of the bumper beam 14. The roll formed bumper beam 14 has upper and lower tubular sections 60, 62 that are spaced apart from each other by a portion of the front wall 64 of the bumper beam 14 that defines the front face 22. The upper and lower tubular portions 60, 62 of the beam 14 have rear-facing surfaces are substantially vertically aligned with each other. A top shear wall 63 of an upper tubular section 60 of the bumper beam 14 is in planar alignment with a bottom shear wall 65 of a lower tubular section 62 of the bumper beam 14. The lower tubular portion 62 of the beam 14 also includes a bottom extension 67 that extends downward from the form bottom shear wall 65 to extend the front wall 64 lower and thereby expand the front face 22 of the beam 14.

Figure 4A:
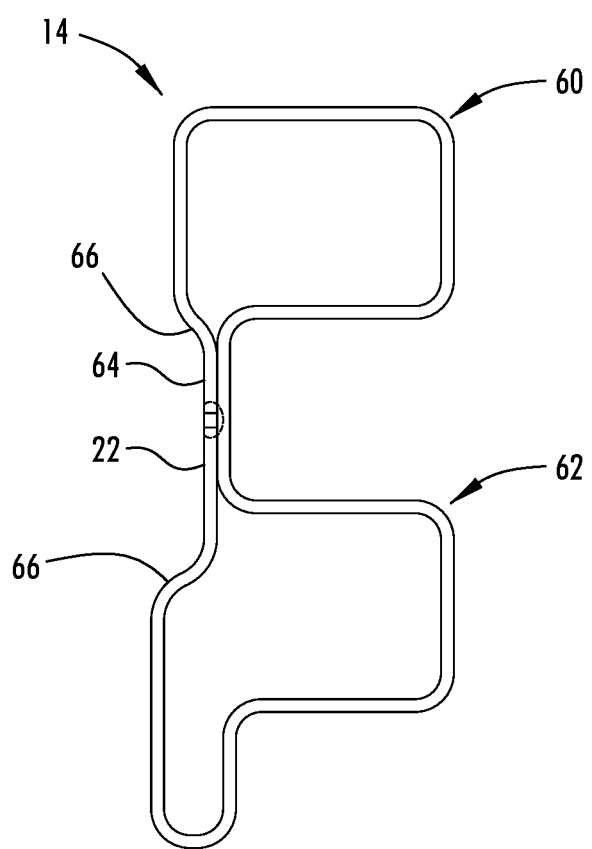
FIG. 4A is a cross-sectional view of the bumper beam shown in FIG. 4.

Also, a stiffening channel defined between rearward indentations 66 formed in the front wall 64 of the beam 14, such as shown in FIG. 4A. The stiffening channels 66 protrude into an interior volume of each tubular portion 60, 62 and function to stiffen the forward-facing or impact surface 14a of the beam 14. In other examples, the bumper beam may be similarly formed with more or fewer stiffening channels or ribs. The bumper beam can be made of differently gauged steel sheets, such as a thickness of about 0.8 mm to 3.0 mm, such as approximately between 1 mm and 1.5 mm. It is understood that additional embodiments of the beam may assume various shapes and orientations from that illustrated and may include alternative dimensions and proportions, such as for use with different types of vehicles.

The crush cans 16 of the bumper assembly 10 may also be embodied in various configurations and materials, such as steel, aluminum, and fiber-reinforced composites, among other materials or combinations thereof. For example, as shown in FIG. 3, the crush can 16 has a tubular can portion 68 that is attached between a frame engaging plate 70 and a front plate 72, such as via welding or other attachment means. The can portion 68 of the crush can 16 provides the side wall of the crush can is shown with a cross-section having a rounded rectangular tube shape. The frame engaging plate 70 of the crush can 16 has an opening that can be used for an assembly access opening or for routing a wire harnesses or the like. The peripheral portion of the frame engaging plate 70 defines a frame-side flange that is disposed at and circumscribes a rear end of the crush can 16. The frame side flange is configured to mount to a frame member F (FIG. 1), such as via fasteners that engage mounting apertures that extend through the peripheral portion of the frame engaging plate 70. It is contemplated that other fastening techniques may be used to mount the crush cans 16 to the bumper beam 14 and the frame member F, such as welding, adhesives, rivets, or other attachments or combinations thereof.

Figure 5:
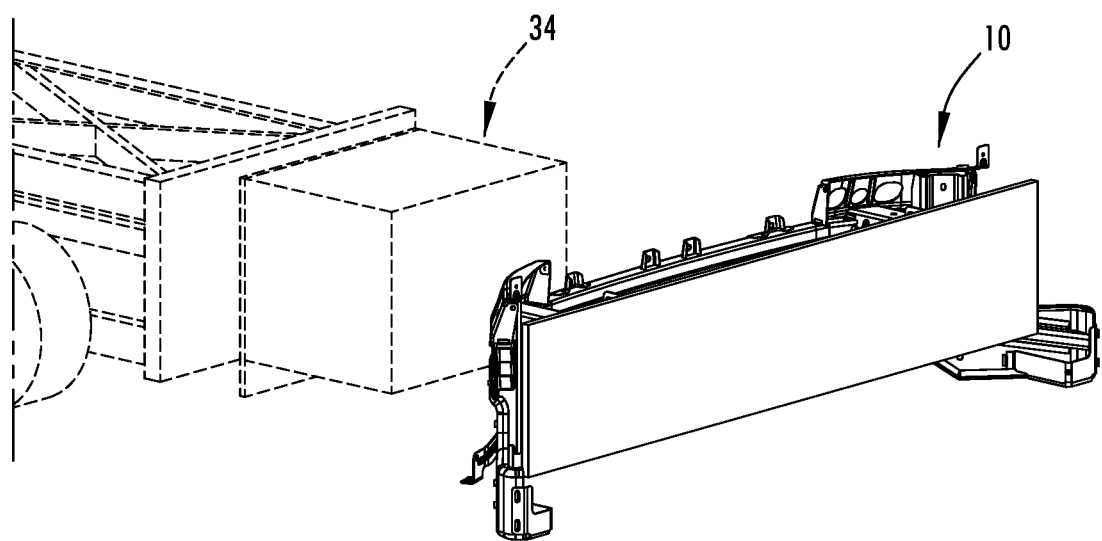
FIG. 5 is a perspective view of the bumper assembly of FIG. 2 contacting a movable progressive deformable barrier.

Upon impact with an object that at least partially overlaps the impact surface of the bumper assembly formed by the dispersion plates, the reinforcement members are configure to support the dispersion plates and at least partially transfer impact forces to the bumper beam. For example, the upright and lower reinforcement members 30, 32 are configured, upon impact with a barrier, to disperse deformation of the barrier over the impact dispersion plate 20 below the bumper beam 14 and the upper dispersion plate 24 above the bumper beam 14. As shown in FIG. 5, the barrier that contacts the bumper assembly 10 is a movable progressive deformable barrier 34 that is attached to a trolley for performing MPDB collision tests. The dispersion plates 20, 24 sustain a more homogenous deformation to the barrier 34 around the bumper beam 14 due to the rigidity provided by the hollow beam structures formed by each of the reinforcement members 30, 32 against the rear surfaces of the dispersion plates 20, 24.

Figure 6:
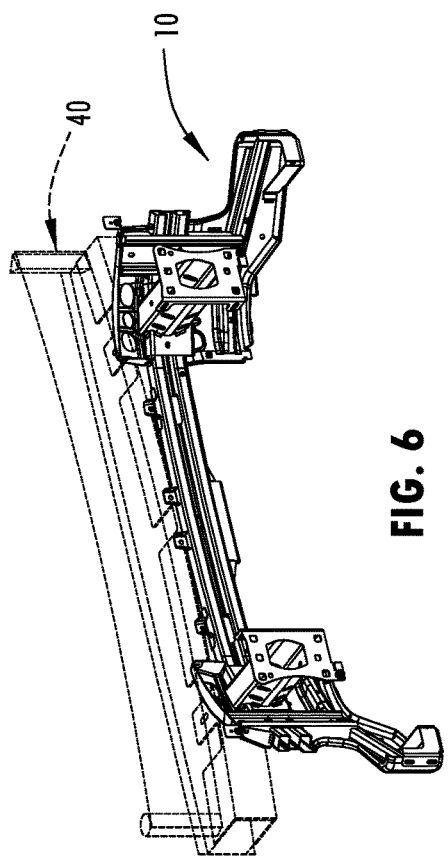
FIG. 6 is a perspective view of the bumper assembly of FIG. 2 contacting a test impact barrier.
Figure 6A:
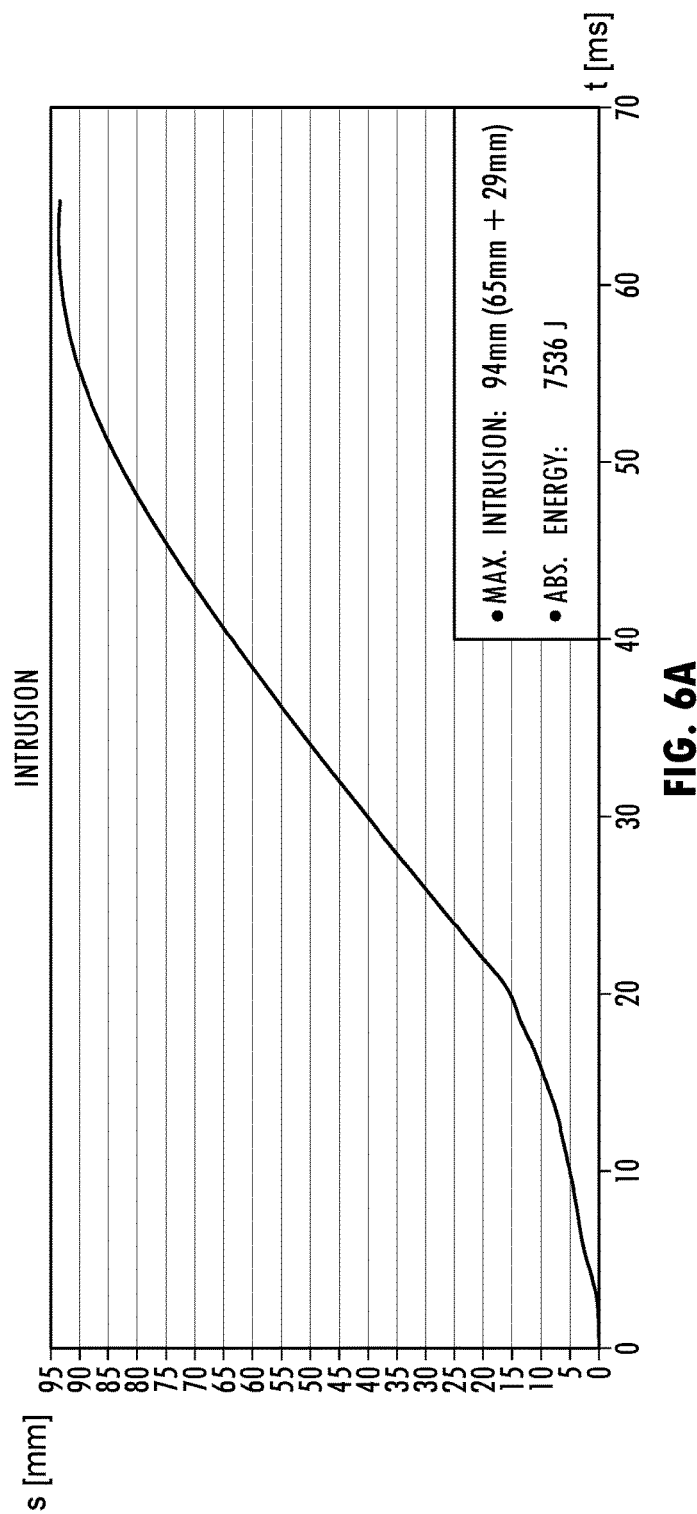
FIG. 6A is a chart of displacement over time at the impact barrier shown in FIG. 6.
Figure 7:
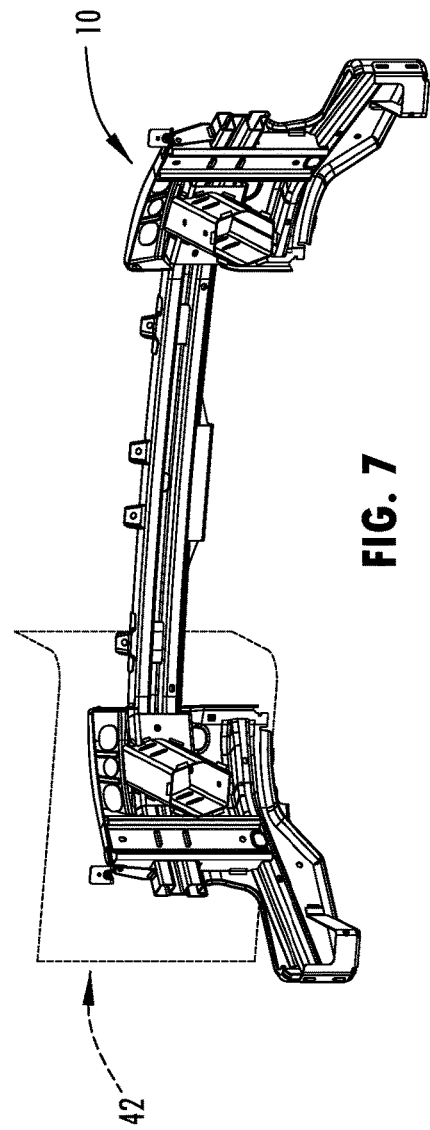
FIG. 7 is a perspective view of the bumper assembly of FIG. 2 contacting a small overlap rigid barrier.
Figure 7A:
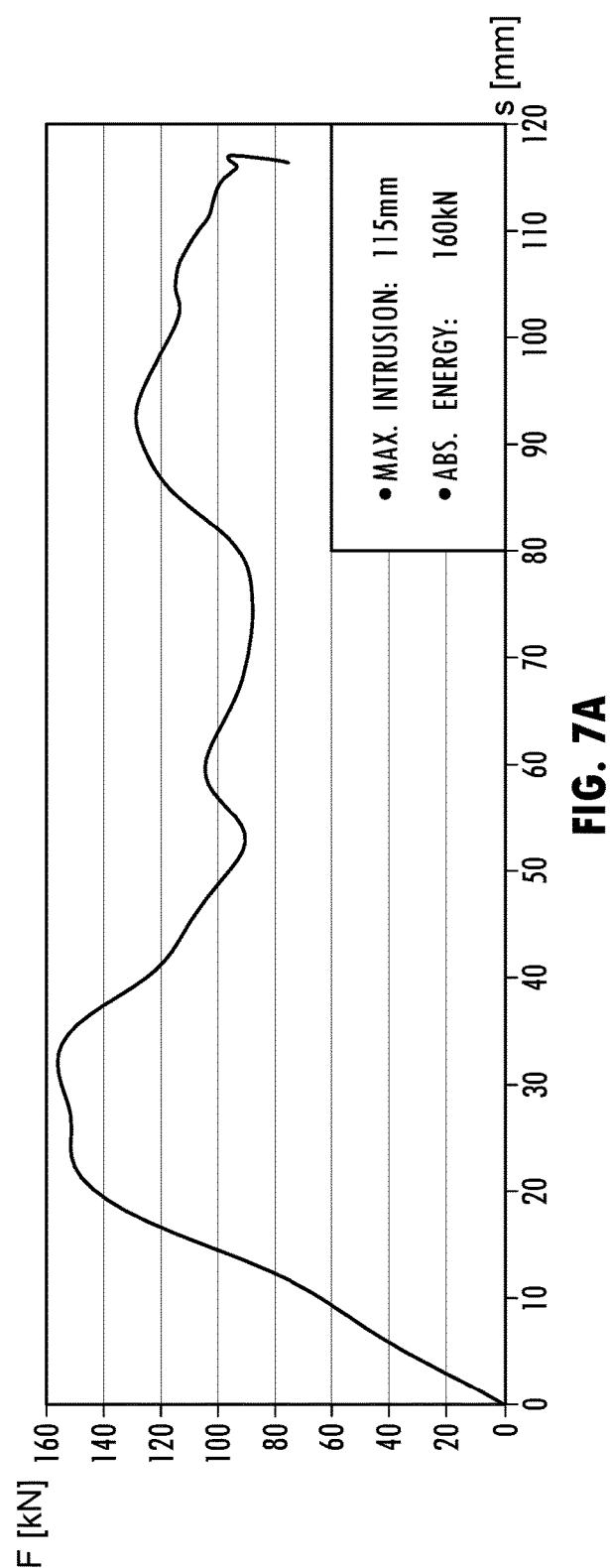
FIG. 7A is a chart of force over displacement at the barrier shown in FIG. 7.

With respect to other impact testing, different testing examples and the corresponding results of such tests are shown in FIGS. 6-9A. For example, as shown in FIG. 6, the bumper assembly 10 is contacting a test impact barrier, which may be referred to as an RCAR barrier 40. In this test, as shown in FIG. 6A, the beam provided a maximum intrusion of 94 mm and energy absorption of 7,536 J. As another example, as shown in FIG. 7, the bumper assembly 10 is contacting a small overlap rigid barrier, which may be referred to as a SORB barrier 42. In this impact test, as shown in FIG. 7A, the maximum intrusion was 115 mm with a maximum load of 160 kN occurring early in the deformation process, at around 35 mm of intrusion.

Figure 8:
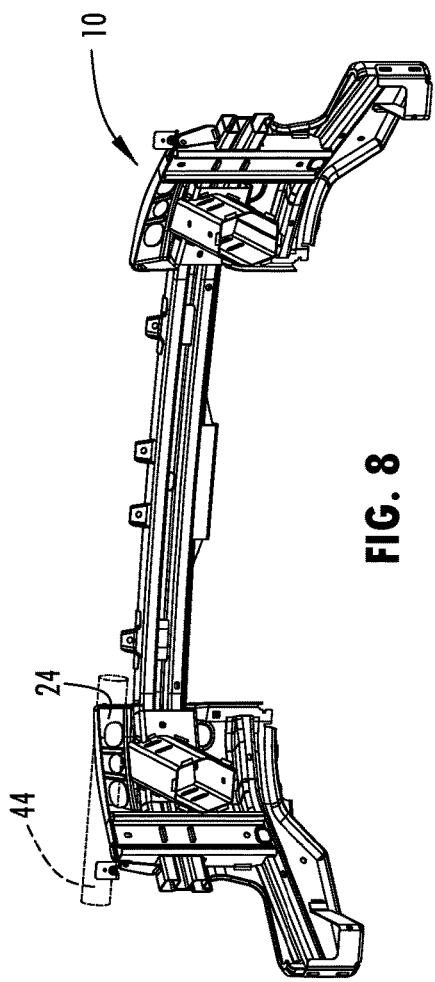
FIG. 8 is a perspective view of the bumper assembly of FIG. 2 contacting a test barrier at an upper dispersion plate.
Figure 8A:
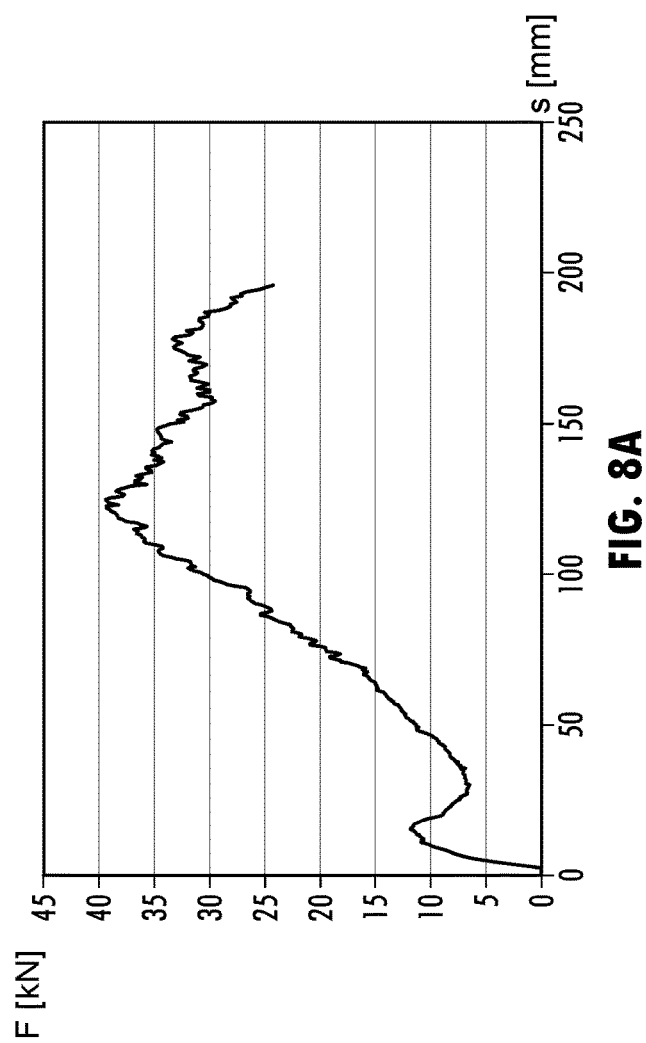
FIG. 8A is a chart of force over displacement at the barrier shown in FIG. 8.
Figure 9:
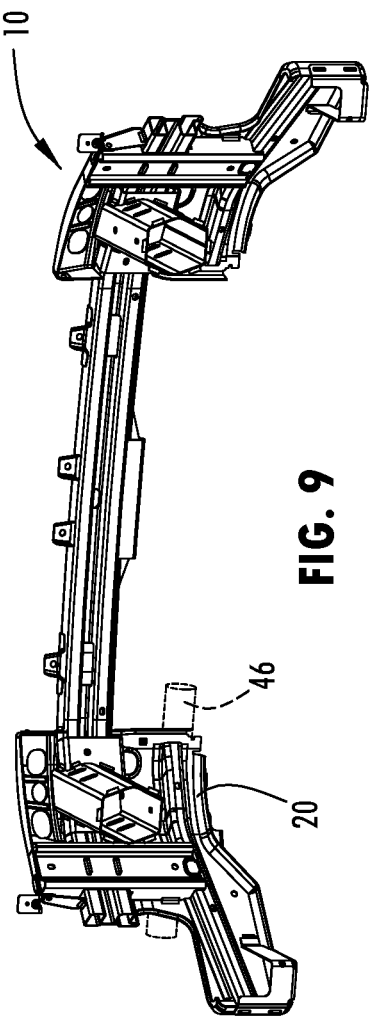
FIG. 9 is a perspective view of the bumper assembly of FIG. 2 contacting a test barrier at the impact dispersion plate.
Figure 9A:
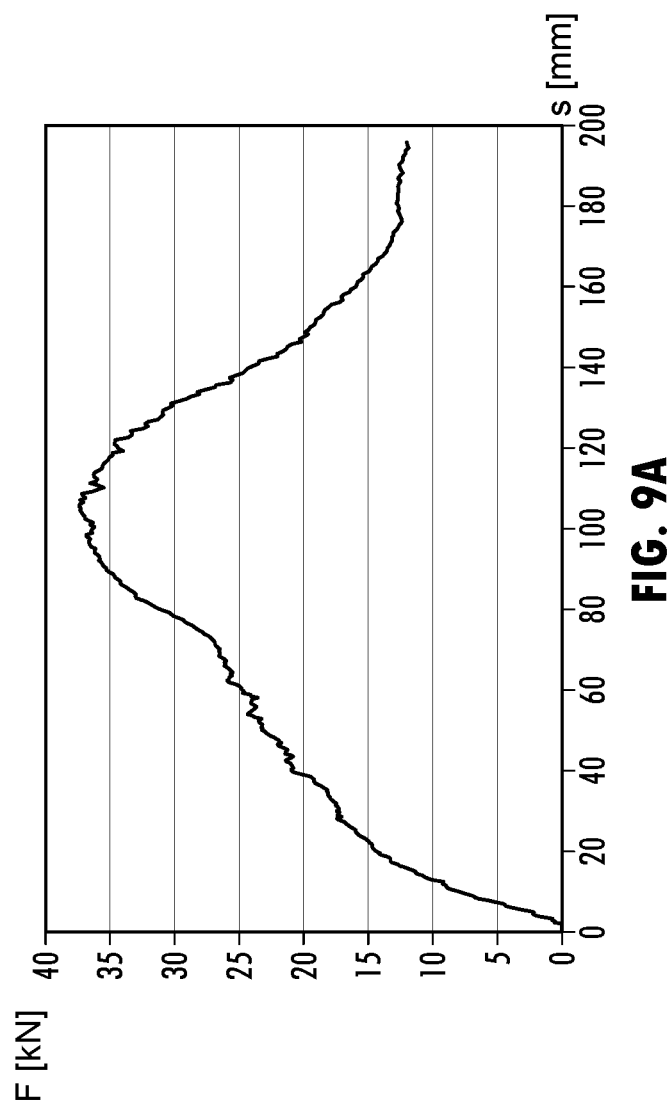
FIG. 9A is a chart of force over displacement at the barrier shown in FIG. 9.

To more precisely target and test the performance of the dispersion plates, additional impact testing was also performed. For example, as shown in FIG. 8, the bumper assembly 10 is contacting a test barrier 44 solely at the upper dispersion plate 24. In this impact test, as shown in FIG. 8A, the maximum intrusion was around 200 mm with a maximum load of approximately 40 kN occurring at around 120 mm of intrusion. In a further example, as shown in FIG. 9, the bumper assembly 10 is contacting a test barrier 46 solely at the impact dispersion plate 20. In this impact test, as shown in FIG. 9A, the maximum intrusion was around 200 mm with a maximum load of approximately 37 kN occurring at around 110 mm of intrusion. The performance of exemplary reinforced dispersion plates in these test provided a significant performance improvement over existing bumper system designs, while also providing a substantial mass savings to the bumper assembly (e.g., over 6 kg or at least over 3 kg).

Figure 10:
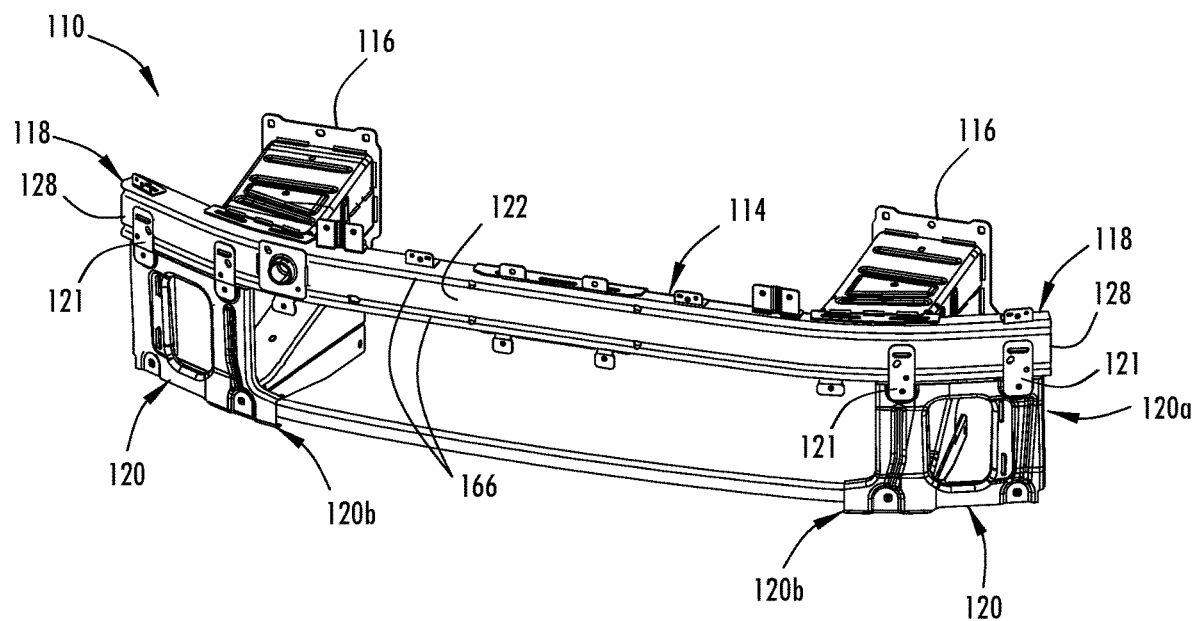
FIG. 10 is perspective view of a bumper assembly according to another example.
Figure 11:
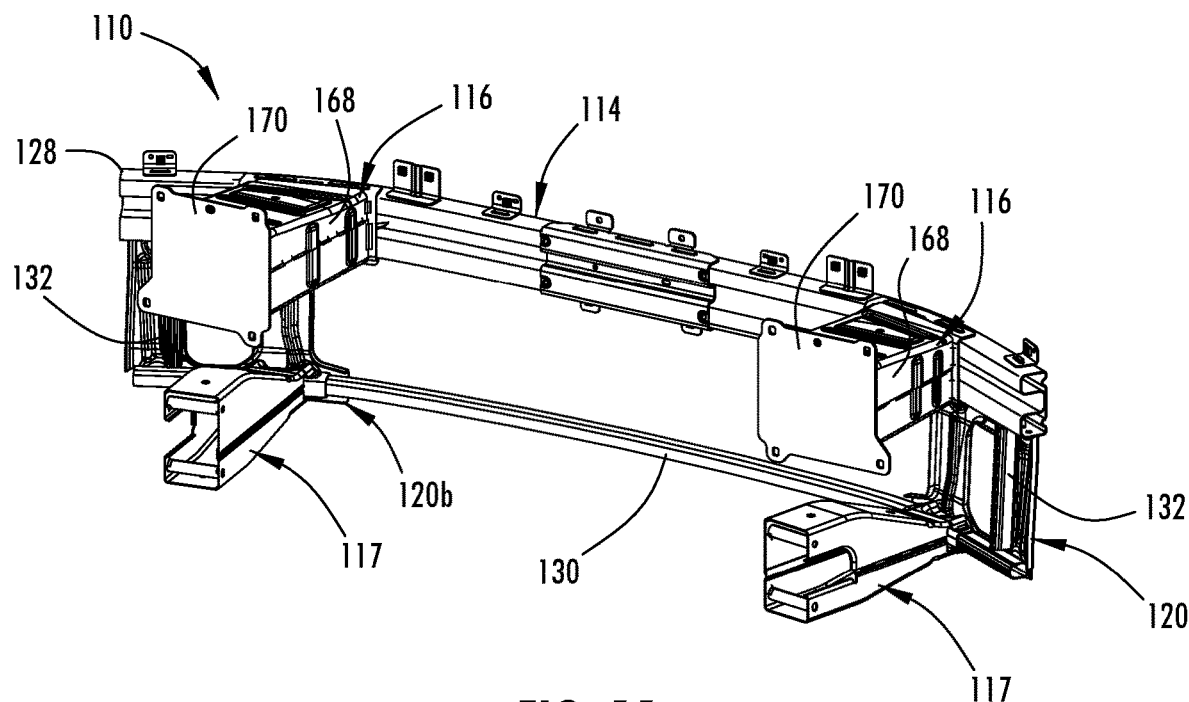
FIG. 11 is a rear perspective view of the bumper assembly shown in FIG. 10.

Referring now to the example shown in FIGS. 10-12A, the bumper assembly 110 may be similar to the bumper assembly 10 as described above, including but not limited to the crush cans 116, the impact dispersion plates 120, and the bumper beam 114 having end portions 118, a front face 112, and distal ends 128. In the example shown in FIGS. 10-11A, the impact dispersion plates 120 are supported by an upright reinforcement members 132 and a single lower reinforcement member 130 that spans horizontally below the bumper beam 114 between the impact dispersion plates 120. As shown in FIGS. 10-11, the crush cans 116 that are attached to end portions 118 of the bumper beam 114 at generally equal spacing from a center of the bumper beam 114. The crush cans 116 of the bumper assembly 110 each mount to a frame member, such as a frame rail or other portion of a conventional vehicle frame or frame-like structure. The crush cans 116 support and position the bumper beam 114 to span laterally across a front end of the vehicle. The example shown in FIGS. 10-11A also includes additional supportive cans 117 that extend rearward from the lower reinforcement member 130.

The impact dispersion plates 120 are disposed at the end portions 118 of the bumper beam 114. As shown for example in FIG. 10, the impact dispersion plates 120 are attached to the front face 122 of the bumper beam 114 and extend downward below the front face 122 of the bumper beam 114 to expand an effective impact surface of the bumper assembly 110. The impact dispersion plates 120 may have various shapes to expand the effective impact surface within the packaging constraints and impact performance of a vehicle front end design. As shown in FIG. 10, the impact dispersion plates 120 each include an upper section 120a with generally planar areas that overlap and attached at the lower area of the front face 122 of the bumper beam 114. The upper section 120a may conform at least partially to the shape of the front face 122. The upper section 120a of the impact dispersion plates 120 is attached to the bumper beam 114 in a fixed manner, such as with welding to secure the upper section 120a to the front face 122. The upper section 120a includes connection plates 121 that attach between the front face of the bumper beam 114 and a plate section of the impact dispersion plate. In other examples the impact dispersion plates may be attached to the bumper beam with additional or alternative attachment features, such as fasteners, adhesives, or the like.

Figure 11A:
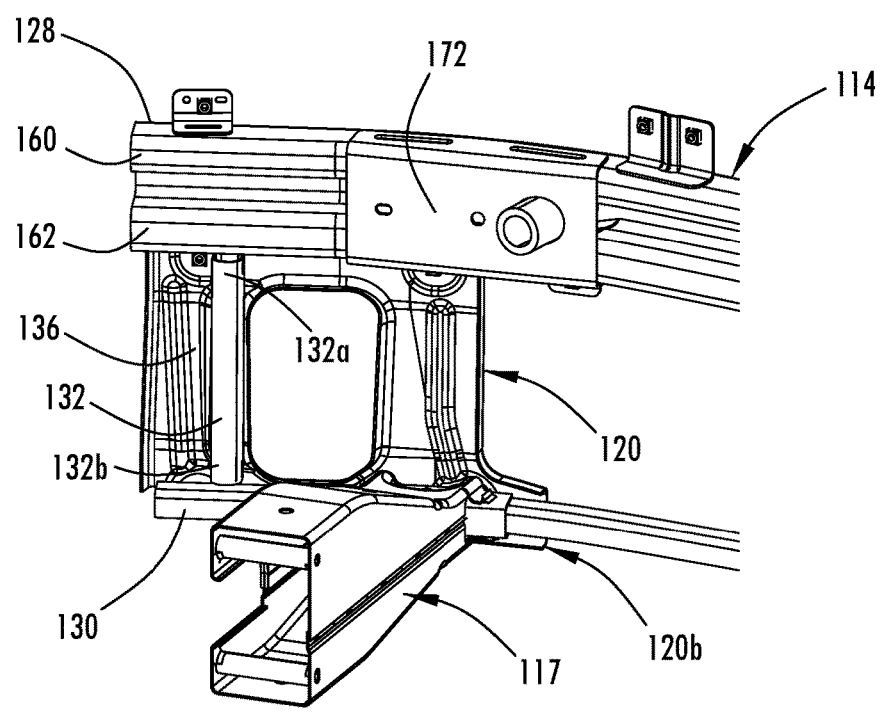
FIG. 11A is a partial rear perspective view of the bumper assembly shown in FIG. 11.
Figure 12:
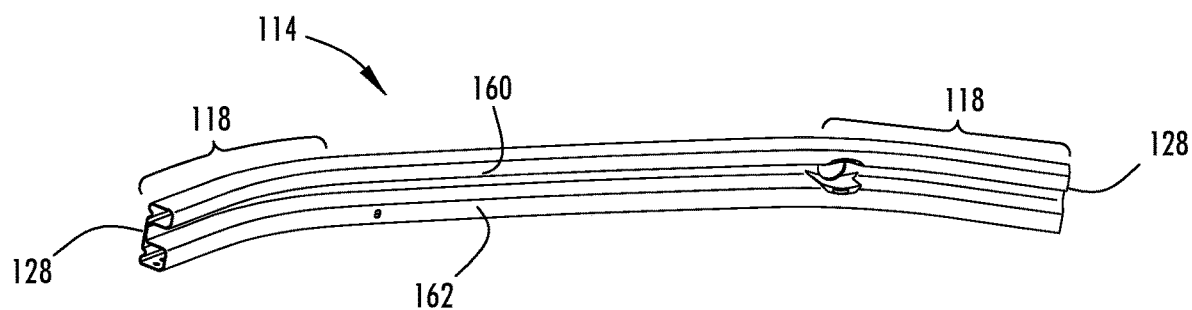
FIG. 12 is a perspective view of a bumper beam shown in FIG. 10.
Figure 12A:
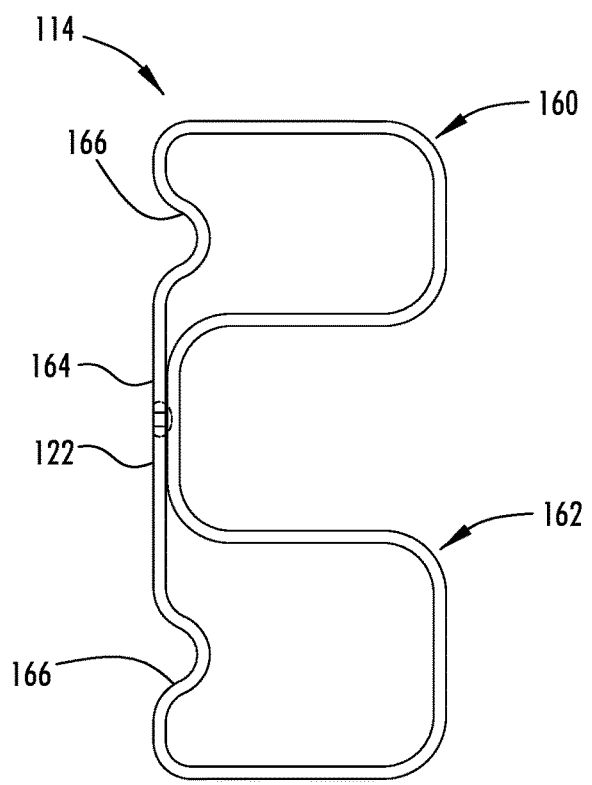
FIG. 12A is a cross sectional view of the bumper beam shown in FIG. 12.

As further provided in the example illustrated in FIGS. 10 and 11, the shape of the impact dispersion plates 120 extends downward from the upper sections 120a to substantially align with the planar extent of the front surface 126 of the front face 122 of the bumper beam 114. The lower sections 120b of the impact dispersion plates 120 may also include a curvature that generally corresponds with the curvature of the end portions 118 of the bumper beam 114. The lower sections 120b may also extend laterally outboard from the distal ends 128 of the bumper beam 114. As shown in FIG. 10, the lower sections 120b of the impact dispersion plates 120 each span from an inboard edge that is located inboard of the attachment of the crush can 116 to an outboard edge that is located outboard of the distal end 128 of the bumper beam 114. The impact dispersion plates 120 are shown in FIGS. 11 and 11A having a bottom edge of the lower section 120b that is substantially horizontal. To assist with maintaining the shape of the impact dispersion plates 120, the edges extending around the inboard edge, outboard edge, and lower section 120b are formed, such as via a stamping, to have a rearward curved flange. The rearward curved flange provides a rounded corner at the edges of the impact dispersion plates 120, which also assist in preventing tearing of a soft impact barrier or the like.

To support and reinforce the additional impact surface provided by the impact dispersion plates 120, reinforcement members are provided as shown in FIGS. 10-11A. As shown in the example in FIG. 11, a lower reinforcement member 130 is attached along the lower section 120b of the impact dispersion plate 120 and an upright reinforcement member 132 is attached between the bumper beam 114 and the lower reinforcement member 130. The lower and upright reinforcement members 130, 132 are configured, upon impact with a barrier, such as a movable progressive deformable barrier 34 as shown for example in FIG. 5, to disperse deformation of the barrier over the impact dispersion plate 20 below the bumper beam 114. In addition to increasing the effectiveness of the impact dispersion plate, the reinforcement members also provide significantly less mass and more packaging space flexibility than lower cross members and secondary crush can arrangements.

As shown in FIG. 11A, the lower reinforcement member 130 is attached to a rear surface 136 of the impact dispersion plate 120 and extends along a lower section 120b of the impact dispersion plate 120. The lower reinforcement member 130 may be a beam-shaped reinforcement, such as a beam structure with a consistent cross-sectional shape along its length, such as a closed tubular cross section (e.g., a single or multi-hollow tubular shape with circular or non-circular shaped cross sectional hollow openings) or an open cross section (e.g., a C-shape or U-shape). As shown in the example in FIGS. 10-11A, the lower reinforcement member 130 includes a single hollow tubular shaped cross section that extends continuously along a length of the lower reinforcement member 130. As further shown in FIG. 11, the lower reinforcement member 130 is disposed in parallel or substantially parallel alignment with the bumper beam 14 and connects between the two separate impact dispersion plates 120 as a single tubular member.

As further shown in FIG. 11A, the upright reinforcement member 132 has an upper portion 132a attached to the bumper beam 14 and a lower portion 132b attached to the lower reinforcement member 130. The upright reinforcement member 132 may be a beam-shaped reinforcement, such as a beam structure with a consistent cross-sectional shape along its length, such as a closed tubular cross section (e.g., a single or multi-hollow tubular shape with circular or non-circular shaped cross sectional hollow openings) or an open cross section (e.g., a C-shape or U-shape). As shown in the example in FIGS. 11 and 11A, the upright reinforcement member 132 includes a single hollow tubular shaped cross section that extends along the substantial entire length of the upright reinforcement member 132, such as between the upper and lower portions 132a, 132b. The lower portion 132b of the upright reinforcement member 132 is attached to the rear surface 136 of the impact dispersion plate 120. The upright reinforcement member 132 is disposed in a vertical or a substantially vertical orientation, such as to be generally perpendicular or substantially perpendicular to the end portion 118 of the bumper beam 114. In some examples the reinforcement members may be attached to the dispersion plates and the bumper beam with additional or alternative attachment features from welding, such as fasteners, adhesives, tape, or the like, such as in instances of different materials that are not suited for welding together.

In additional examples, more or fewer reinforcement members may be attached to or integrated with the dispersion plates. The reinforcement members may be embodied in various configurations and materials, such as steel, aluminum, and fiber-reinforced composites, among other materials or combinations thereof. As shown for example in FIGS. 11 and 11A, the lower and upright reinforcement members 130, 132 are manufactured by roll forming a metal sheet, such as an aluminum sheet or a steel sheet, such as AHSS (Advanced High Strength Steel) that has a tensile strength of about 800 to 2000 MPa (i.e. about 120 to 290 ksi), to provide a continuous beam that is cut to length to define the ends of each reinforcement member.

Additionally, the bumper beam 114 includes the upper tubular portion 160, the lower tubular portion 162, and the stiffening channels 166. However, as best-shown in the example shown in FIG. 10E, the bumper beam 14 has a different cross-sectional shape such that in the lower tubular portion 160 the bottom shear wall 165 is planar such that it does not include the extension described above with respect to the bumper beam 14 described above. Additionally, each of the upper tubular portion 160 and the lower tubular portion 162 include the stiffening channel 166 defined therein such that the front wall includes two stiffening channel 166. In the example shown in FIG. 10E, the stiffening channels 166 are approximately centrally located on each of the front wall 164 of the lower tubular portion 160 and the upper tubular portion 162. However, various other locations have been contemplated. Additionally, while the example shown in FIG. 10E illustrates two stiffening channels 166, more or less stiffening channels have been contemplated.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

Also for purposes of this disclosure, the articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical,"

"horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle bumper assembly comprising:
   a bumper beam;
   a crush can attached to an end portion of the bumper beam;
   an impact dispersion plate attached to a front face of the bumper beam at the end portion of the bumper beam, a front surface of the impact dispersion plate extending downward from the front face of the bumper beam;
   a lower reinforcement member attached to a rear surface of the impact dispersion plate and disposed along a lower section of the impact dispersion plate; and
   an upright reinforcement member having an upper portion attached to the bumper beam and a lower portion attached to the lower reinforcement member, the upright and lower reinforcement members configured upon impact with a barrier to disperse deformation of the barrier over the impact dispersion plate below the bumper beam.

2. The vehicle bumper assembly of claim 1, wherein the upright reinforcement member comprises a consistent cross section between the upper and lower portions, and wherein the upright reinforcement member together with the impact dispersion plate defines a hollow beam structure.

3. The vehicle bumper assembly of claim 2, wherein the lower reinforcement member comprises a cross section having legs that are attached to the rear surface of the impact dispersion plate to define a secondary hollow beam structure.

4. The vehicle bumper assembly of claim 1, wherein at least a section of the lower reinforcement member is disposed in parallel alignment with the end portion of the bumper beam.

5. The vehicle bumper assembly of claim 1, wherein a distal end of the bumper beam extends outboard from the crush can.

6. The vehicle bumper assembly of claim 5, wherein the distal end of the bumper beam extends outboard from the attachment of the impact dispersion plate and the upright reinforcement member.

7. The vehicle bumper assembly of claim 5, wherein the lower section of the impact dispersion plate extends outboard from the distal end of the bumper beam.

8. The vehicle bumper assembly of claim 7, wherein the lower reinforcement member extends along the lower section of the impact dispersion plate from inboard of the crush can to outboard of the distal end of the bumper beam, and wherein the lower portion of the upright reinforcement member attaches to an intermediate section of the lower reinforcement member.

9. The vehicle bumper assembly of claim 1, further comprising an upper dispersion plate attached to a front face of the bumper beam at the end portion of the bumper beam and extending upward from the front face of the bumper beam, wherein the upper portion of the upright reinforcement member extends above the bumper beam and attaches at a rear surface of the upper dispersion plate.

10. A vehicle bumper assembly comprising:
    a bumper beam comprising a front face configured to be deposed behind a front fascia;
    a crush can having a front end attached at an end portion of the bumper beam and a rear end configured to attach to a frame member;
    an impact dispersion plate coupled with the front face at the end portion of the bumper beam, the impact dispersion plate extending downward from the front face; and
    an upright reinforcement member having an upper portion attached to the bumper beam and a lower portion extending to a lower section of the impact dispersion plate,
    wherein the upright reinforcement member is configured upon impact with a barrier to disperse deformation of the barrier over the impact dispersion plate below the bumper beam.

11. The vehicle bumper assembly of claim 10, wherein the upright reinforcement member comprises a U-shaped cross section extending at least partially between the upper and lower portions.

12. The vehicle bumper assembly of claim 11, wherein the U-shaped cross section of the upright reinforcement member includes legs that are attached to the rear surface of the impact dispersion plate to together define a hollow beam structure.

13. The vehicle bumper assembly of claim 10, further comprising:
    a lower reinforcement member attached at a rear surface of the impact dispersion plate and disposed at a lower section of the impact dispersion plate, wherein the lower portion of the upright reinforcement member is attached to the lower reinforcement member.

14. The vehicle bumper assembly of claim 10, wherein a distal end of the bumper beam extends laterally outboard from the crush can and the attachment of the impact dispersion plate.

15. The vehicle bumper assembly of claim 14, wherein the lower section of the impact dispersion plate extends outboard from the distal end of the bumper beam, and wherein the lower reinforcement member extends outboard from the distal end of the bumper beam.

16. The vehicle bumper assembly of claim 10, further comprising:
    an upper dispersion plate integrally extending from the impact dispersion plate upward from the front face of the bumper beam, wherein the upper portion of the upright reinforcement member attaches at a rear surface of the upper dispersion plate.

17. A vehicle bumper assembly comprising:
    a bumper beam;

an impact dispersion plate disposed at an end portion of the bumper beam and comprising a front surface that extends downward from the bumper beam, wherein the front surface of the impact dispersion plate and a face surface of the bumper beam together comprise an effective impact surface;

a first reinforcement member attached to a rear surface of the impact dispersion plate and disposed at a lower section of the impact dispersion plate; and a second reinforcement member having an upper portion attached to the bumper beam and a lower portion attached to the first reinforcement member, wherein the first and second reinforcement members support the impact dispersion plate so that upon impact with a barrier deformation of the barrier is dispersed over the effective impact surface.

18. The vehicle bumper assembly of claim 17, further comprising:

a crush can attached to the end portion of the bumper beam, wherein the second reinforcement member is attached to the bumper beam laterally outboard from the crush can.

19. The vehicle bumper assembly of claim 18, wherein a distal end of the bumper beam extends outboard from the crush can, and wherein the lower section of the impact dispersion plate extends outboard from the distal end of the bumper beam.

20. The vehicle bumper assembly of claim 17, wherein the second reinforcement member comprises a cross sectional having legs that are attached to impact dispersion plate to define a hollow beam structure.

\* \* \* \* \*